(12) United States Patent
Chudoba

(10) Patent No.: US 10,748,275 B2
(45) Date of Patent: Aug. 18, 2020

(54) METHOD FOR THE ANALYSIS OF SURFACE MEASUREMENTS

(71) Applicant: ASMEC Advanced Surface Mechanics GmbH, Dresden (DE)

(72) Inventor: Thomas Chudoba, Dresden (DE)

(73) Assignee: ASMEC Advanced Surface Mechanics GmbH, Dresden (DE)

(*) Notice: Subject to any disclaimer, the term of this patent is extended or adjusted under 35 U.S.C. 154(b) by 16 days.

(21) Appl. No.: 15/944,879

(22) Filed: Apr. 4, 2018

(65) Prior Publication Data

US 2018/0293726 A1 Oct. 11, 2018

Related U.S. Application Data

(60) Provisional application No. 62/481,705, filed on Apr. 5, 2017.

(30) Foreign Application Priority Data

Apr. 5, 2017 (DE) .................. 10 2017 107 270

(51) Int. Cl.
| | |
|---|---|
| *G06T 7/40* | (2017.01) |
| *G01B 11/30* | (2006.01) |
| *G01N 3/06* | (2006.01) |
| *H04N 5/232* | (2006.01) |
| *G06T 7/00* | (2017.01) |
| *G01N 3/46* | (2006.01) |
| *G01B 11/00* | (2006.01) |

(52) U.S. Cl.
CPC .......... *G06T 7/0008* (2013.01); *G01B 11/002* (2013.01); *G01B 11/303* (2013.01); *G01N 3/068* (2013.01); *G01N 3/46* (2013.01); *G06T 7/40* (2013.01); *H04N 5/23293* (2013.01); *H04N 5/23296* (2013.01); *G01N 2203/02* (2013.01); *G01N 2203/0647* (2013.01)

(58) Field of Classification Search
CPC ................ G01B 11/002; G01B 11/303; G01N 2203/0647; G01N 3/46
See application file for complete search history.

(56) References Cited

U.S. PATENT DOCUMENTS

| | | | | |
|---|---|---|---|---|
| 5,992,224 A | * | 11/1999 | Weinhold ................. | G01N 3/42 73/81 |
| 6,172,794 B1 | * | 1/2001 | Burdis .................. | G02F 1/1523 359/267 |
| 6,328,894 B1 | * | 12/2001 | Chan .................... | C09D 11/324 106/31.65 |
| 6,945,097 B2 | * | 9/2005 | Jardret ..................... | G01N 3/46 73/799 |
| 6,996,264 B2 | * | 2/2006 | Hauck ...................... | G01N 3/08 382/141 |
| 7,139,422 B2 | * | 11/2006 | Hauck ...................... | G01N 3/08 382/141 |

(Continued)

*Primary Examiner* — Obafemi O Sosanya
(74) *Attorney, Agent, or Firm* — Michael Soderman

(57) ABSTRACT

A method for the analysis of surface measurements, in particular scratch tests, wear tests or profilometric measurements, wherein a graph with displayable curves in the form of measuring curves of already analyzed results with an X-axis as a coordinate axis along a measuring path is laid over a live image or subsequently over a stored image of the measuring section such that the X-coordinates in the image coincide with the X-coordinates of the curves.

12 Claims, 2 Drawing Sheets

(56) References Cited

U.S. PATENT DOCUMENTS

| | | | | |
|---|---|---|---|---|
| 7,287,418 B2 * | 10/2007 | Yang | G01N 3/08 | 73/150 A |
| 7,287,419 B2 * | 10/2007 | Yang | G01N 3/46 | 73/150 A |
| 7,287,420 B2 * | 10/2007 | Yang | G01N 3/08 | 73/150 A |
| 7,316,155 B2 * | 1/2008 | Chudoba | B23Q 1/36 | 33/568 |
| 7,628,065 B2 * | 12/2009 | Yang | G01N 19/04 | 73/150 A |
| 7,645,308 B2 * | 1/2010 | Kaner | B23B 27/148 | 423/276 |
| 8,200,465 B2 * | 6/2012 | Suarez-Rivera | E21B 43/00 | 703/10 |
| 8,261,600 B2 * | 9/2012 | Coudert | G01N 3/42 | 382/100 |
| 2005/0265593 A1 * | 12/2005 | Hauck | G01N 3/08 | 382/141 |
| 2009/0145208 A1 * | 6/2009 | Coudert | G01N 3/42 | 73/81 |
| 2009/0260883 A1 * | 10/2009 | Suarez-Rivera | G01V 11/00 | 175/58 |
| 2009/0303379 A1 * | 12/2009 | Wada | G03B 15/00 | 348/373 |
| 2013/0047713 A1 * | 2/2013 | Ariga | G01N 3/068 | 73/81 |
| 2014/0078299 A1 * | 3/2014 | Kataoka | G01N 3/42 | 348/137 |
| 2014/0226866 A1 * | 8/2014 | Crandall | G06T 7/74 | 382/107 |
| 2015/0161778 A1 * | 6/2015 | Henderkott | F01D 17/14 | 348/129 |
| 2016/0282249 A1 * | 9/2016 | Leroux | G01N 3/42 | |
| 2018/0149846 A1 * | 5/2018 | Yin | G01B 21/042 | |
| 2019/0120770 A1 * | 4/2019 | Chen | G01N 21/8851 | |
| 2019/0145878 A1 * | 5/2019 | Coudert | G01N 3/46 | 73/81 |

* cited by examiner

METHOD FOR THE ANALYSIS OF SURFACE MEASUREMENTS

CROSS REFERENCE TO RELATED APPLICATIONS

This application claims the priority of DE 102017107270.5 filed on 2017 Apr. 5 and also claims the priority of the U.S. provisional application 62/481,705 filed on Apr. 5, 2017; these applications are incorporated by reference herein in their entirety.

BACKGROUND

The invention relates to a method for the analysis of surface measurements and is used in particular for the analysis of scratch tests, wear tests or profilometric measurements.

Scanning the surface with a fine tip of a few micrometers in diameter, usually diamond, and at a constant contact force is a common way to determine the surface profile of a sample by mechanical means. This method is used in profilometers or stylus instruments, as well as in some scratch testers and nanoindenters. As a result, one obtains at least one curve which represents the height profile as a function of the scanning path and which is displayed in a graph on a screen. Corrections are common on the curve, for example correcting a sample slope or ripple. An optical image of the high magnification surface is either not recorded at all or it is displayed independently of the graph with the measuring curve. The measuring path is usually much longer than the image width, which corresponds to a magnification of at least 500×. A method in which exactly the part of the graph in the optical image is displayed, which corresponds exactly to the image position and image width, is not yet known.

Patent EP 2 065 695 B1 describes a method of analyzing a scratch-test scratch using a digital image pickup device with a high magnification lens. The lens is designed to receive only a portion of the scratch. Furthermore, a substrate is used, which is acted upon by means of an indenter with a force. It is characteristic of the method that at the beginning of the method the determination of the initial position of the scratch is made with respect to a reference position. This is followed by the production of the scratch on the substrate by means of the indentator when recording the applied force and at least one further measuring parameter as a function of the displacement of the indenter on the substrate with respect to the reference position. This is followed by the recording of a series of images by means of the recording device. The position of the recorded image of the scratch is always related to the reference position.

This is followed by the synchronization of the recorded images with the curve of the applied force and the other measurement parameters, these then being output subsequently on a screen. The insertion of the force progression by means of the curve is thus displayed after the measurement has been carried out in a diagram with respect to a reference position. No force curve can be shown in the current live image. Another disadvantage is that always a reference position for determining the initial position is needed.

In micro-scratch testing, it is common to scan the surface before and after the test and display the profiles along with the depth of penetration under load. This method has already been described in the patents WO 1994/008219 A1 and U.S. Pat. No. 5,992,224 A and in analogous form in the patent WO 1999/046576 A1 in connection with an apparatus for determining the scratch resistance. In none of these patents, however, the measured profiles are displayed in the image of the surface, in particular not in such a way that even when moving the sample the correct part of the curve is automatically always displayed in the image, which corresponds exactly to the image width.

SUMMARY

The invention relates to a method for the analysis of surface measurements, in particular scratch tests, wear tests or profilometric measurements, wherein a graph with displayable curves in the form of measuring curves of already analyzed results with an X-axis as a coordinate axis along a measuring path is laid over a live image or subsequently over a stored image of the measuring section such that the X-coordinates in the image coincide with the X-coordinates of the curves.

DETAILED DESCRIPTION

It is object of the invention to develop a method for the analysis of surface measurements, in particular for scratch tests, wear tests or profilometric measurements in which a graph with the curves of the already analyzed results can be displayed in an image.

This object is achieved by the characterizing features of the first claim.

Advantageous embodiments will be apparent from the dependent claims.

The invention relates to a method for the analysis of surface measurements, in particular scratch tests, wear tests or profilometric measurements, wherein an automatic table system for the location and measuring path of the area to be analyzed is used, wherein the table coordinates of the table system serve as a reference and in which a graph with the curves of the already analyzed results with the X-axis as coordinate axis along the measuring path is laid over the live image or subsequently over a stored image of the measuring path such that the X-coordinates in the image coincide with the X-coordinates of the curves. The X-coordinates of the image and the X-coordinates of the curves can be taken from the table coordinates with respect to the path of travel of the table.

In this case, the measuring curves preferably occupy the entire width of the image and are automatically adjusted to the image when the portion of the sample displayed in the image changes. Only the part of the measuring path and the curves that fit into the image width of the image of the receiving camera displayed on the screen are shown. The position of the graph, the height of which is usually smaller than the height of the optical image, can be shifted within the height of the image so that it does not partially or completely cover the measuring area, wherein the background of the graph is transparent, so that only the axes with caption and the curves themselves can be seen in the picture. The combination of the image with the graph can then be saved as a new image. The user can select which curves are displayed on one or more Y-axes of the graph.

According to the invention, a graph with displayable curves in the form of measuring curves of already analyzed results with an X-axis as a coordinate axis along a measuring path is placed over a live image or subsequently over a stored image of the measuring path so that the X-coordinates in the image match the X-coordinates of the curves.

The method is characterized by the following features:
- the image of the sample surface is taken by a camera in high magnification (500-3500 times), wherein the image scale is calibrated,
- only the part of the measuring path and the measuring curves is displayed which corresponds to the image width of the image of the receiving camera displayed on the screen,
- all measurements along the X-axis are made approximately parallel to the underside of the image;
- the sample under the camera can be moved in both directions with the automatic table system, wherein the coordinates of the table are determined in this process;
- the measuring curves take up all or part of the width of the image and are automatically adjusted to the image when the section of the sample displayed in the image changes;
- the image of the camera is stored together with information that contains at least information about the table coordinates at the recording location, the distance of the camera from a probe tip, the calibrated image width and height, and the number of pixels in width and height.

The combination of the image with the graph in the form of the measuring curves and coordinate axes with associated units is subsequently stored as a new image.

In an advantageous embodiment, the user can specify which curves are displayed on one or more Y-axes of the graph. In an advantageous embodiment, the profile of the surface is shown on an axis, preferably the Y-axis of the graph, and the coefficient of friction on a second axis and the normal force on a third axis.

The position of the graph, whose height is usually smaller than the height of the optical image, can be shifted within the height of the image so that it does not cover the measuring range, or covers it partially or entirely.

The background of the graph is preferably transparent, so that only the axes with captions and the curves themselves can be seen in the picture. This allows a low coverage of the image.

In an advantageous embodiment, moreover, the brightness of the image can be regulated in order to obtain an optimum setting.

Preferably, for easy handling of the producible files, the coordinates of the table positions are stored during the measurement together with the measurement data in the same data file. This reduces additional files and possible data loss.

The method is preferably characterized in that after a scratch test or a wear test on an axis, first the profile of the surface is displayed before the test (pre-scan), measured with a small load at which no plastic deformation occurs during the scanning. This is followed by a second illustration concerning depth under load, wherein subsequently there is a third illustration which represents the profile of the surface after the test (post-scan), measured with the same load as the pre-scan.

It is particularly advantageous if the sharpness of the image is automatically adjusted by varying the height position of the camera before the graph is faded in.

In an alternative embodiment, the graph does not take the entire image width but only a part of it.

BRIEF DESCRIPTION OF THE DRAWINGS

The invention will be explained in more detail below using an exemplary embodiment and associated drawings, wherein.

DETAILED DESCRIPTION OF THE PREFERRED EMBODIMENTS

Figure 1:
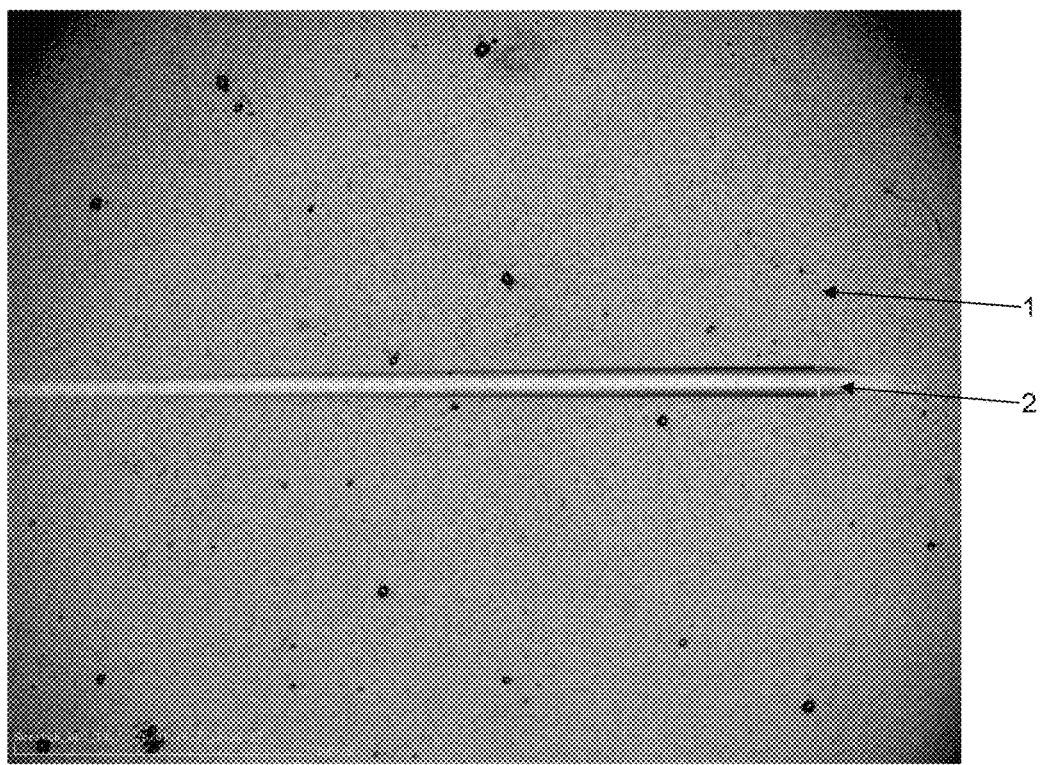
FIG. 1 shows the surface with scratch test without graph.

FIG. 1 shows the surface 1 of a sample with scratch test 2 without superimposed graph. The magnification is about 1000 times.

Figure 2:
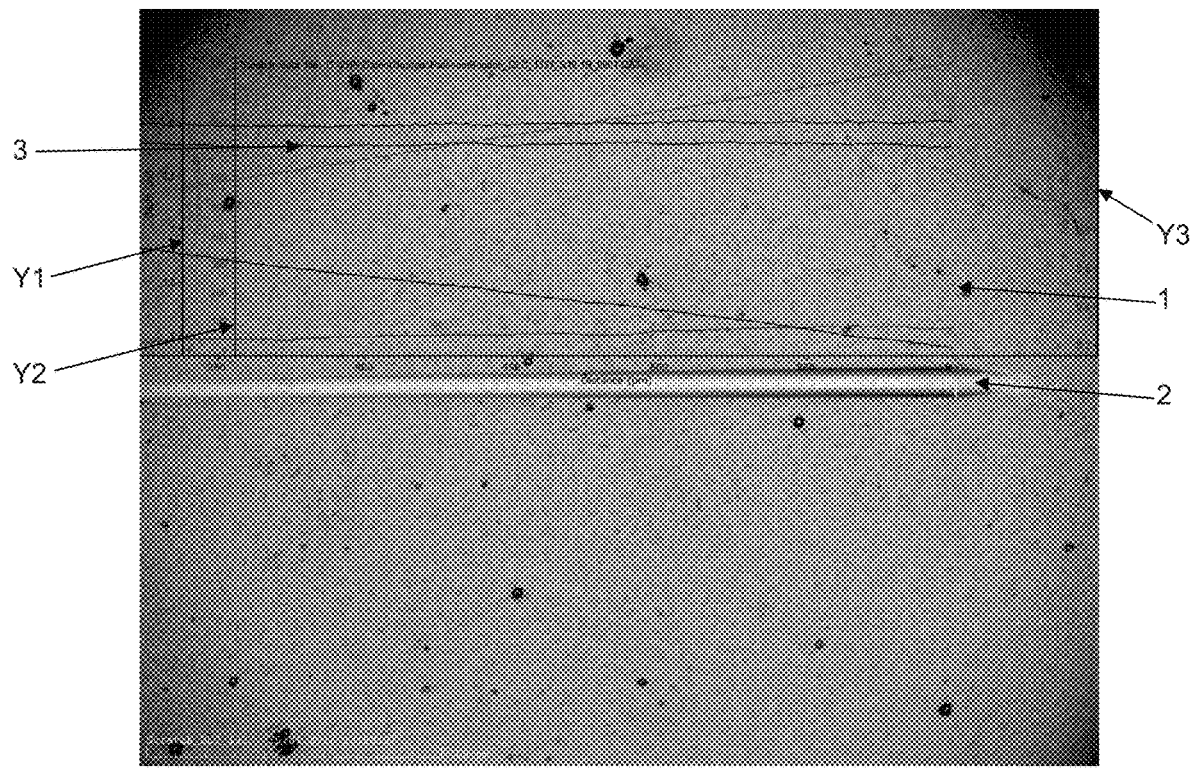
FIG. 2 shows the surface with scratch test with graph.

FIG. 2 shows the image of FIG. 1 with the superimposed graph 3. The scratch test 2 had a length of 600 µm, of which the area from 325 µm to 600 µm is shown in the graph. Three Y-axes (Y1, Y2, Y3) are used.

Figure 3:
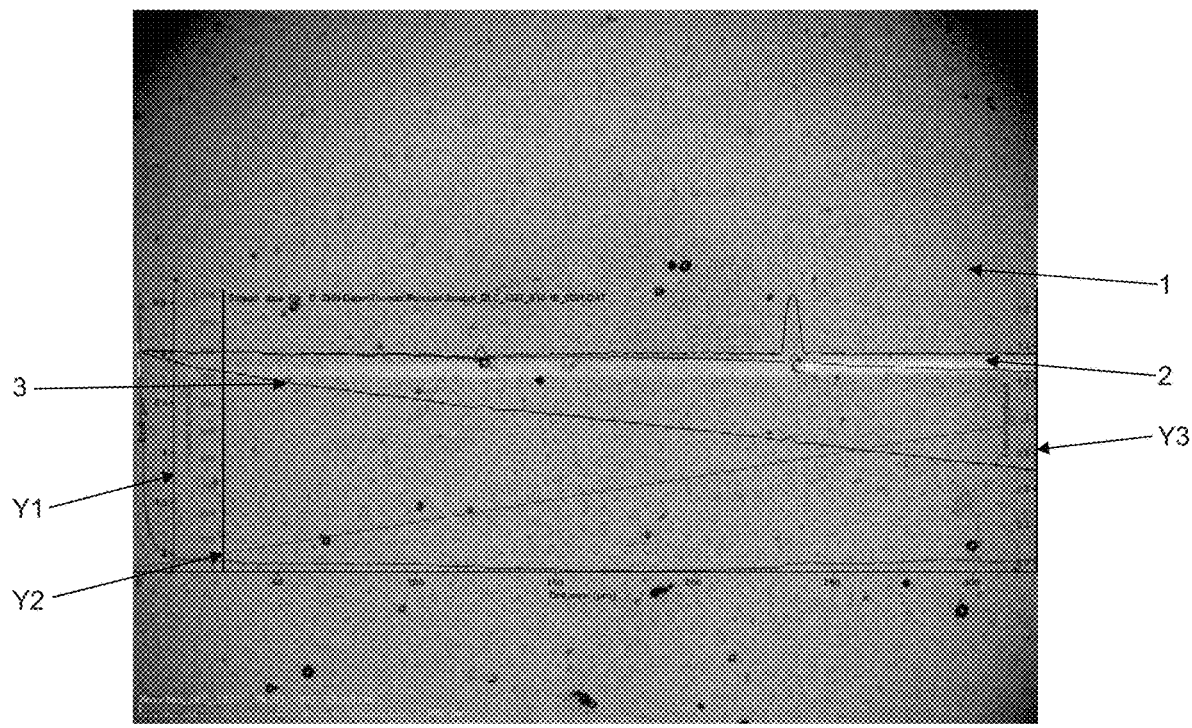
FIG. 3 shows the surface with scratch test with shifted graph.

FIG. 3 shows the beginning of the scratch test of FIG. 1 with the graph 3 displayed. In this example, graph 3 has been moved in the Y-direction. Peaks in the indentation depth curve can be correlated with particles in the layer. Since the probe tip moved from right to left, the front of the tip first contacted the particle, resulting in an offset in the X-direction.

It is the object of the invention to improve the analysis of measurements in which the surface of a sample with a hard tip is scanned or changed parallel to the horizontal of an optical camera image of the sample surface. This is the case, for example, in profilometric measurements of the sample topography, in scratch tests or in wear tests.

For this purpose it is necessary to calibrate the magnification of the camera image on the screen and the distance from the center of the camera image to the probe tip. In order to be able to resolve relevant structures in the camera image, a high magnification of at least 500 times, better still 1000 times or more, is necessary.

If a measurement is now carried out in which the surface is scanned with a tip, this can be done with a force in which the surface does not change or even with a force at which the tip penetrates into the surface and changes the sample permanently. At least the table coordinates of an automatic table system at which the measurement begins and ends are to be stored in electronic form. It is better, however, to record the table coordinates regularly during the measurement and save them together with the other measurement data in a data file.

The table coordinates during the measurement and the known distance between the probe tip and the camera and their magnification now make it possible to establish a clear correlation between the measurement data and the camera image if the measurement data are displayed as a function of the change in position that is simultaneously the scan distance. This can be used to create a graph with the measurement data where at least one Y-axis indicates the elevation profile of the surface and fades into the camera image so that the background is transparent and one only sees the axes with caption and the curves. In this case, the X-axis is parallel to the direction of movement in the test. The graph usually extends over the entire image width.

By inserting the graph directly into the image, it is better possible to assign curvatures, peaks or valleys in the measuring curves to certain structures on the sample without having to place image and graphs next to each other, which at the usual screen height causes both to be strongly limited in height. In addition, by allowing to move the height of the entire graph within the image, it can be prevented that important portions of the image are obscured by measuring curves. For better visibility, it is also necessary to be able to control the brightness of the camera image and to have the curves and axes displayed either in a light color (for example white) or a dark color (for example black).

The graph can be faded into either the live image of the camera or into a saved image. In order to correctly display the graph in a stored image, it is necessary to store the necessary information together with the image, for example in a text file. This includes at least the coordinates of the center of the image, the distance of the camera from the probe tip, the image width and height and the number of pixels in width and height. In addition, the name of the data file containing the measurement data from the measurement associated with the image should be stored.

When using the live image, a software algorithm must be used to ensure that the section of the measurement displayed in the graph is adjusted and updated as the table moves in the X-direction to the new sample section so that the portion of the measuring curve is always displayed which corresponds to the image position. As a result, it is not necessary to take pictures of the entire measuring range and to put them together (especially if it is very long), but the area of the sampled measuring section can be positioned under the camera that is the most interesting, and then be saved together with the associated measurement data in the graph in a picture.

For scratch and wear tests, in addition to the surface profile before the test, the depth under load and the surface profile after the test can also be displayed on the same axis. Further axes can be used to display the normal force and the coefficient of friction or the lateral force and for the representation of further measured variables, such as the contact resistance of tip-sample.

The invention claimed is:

1. A method for analysis of surface measurements, in particular scratch tests, wear tests or profilometric measurements, characterized in that an automatic table system is used for a position and measuring path of an area to be analyzed, wherein table coordinates of a table system serve as a reference and that a graph with displayable curves in shape of measuring curves of already analyzed results with an X-axis as coordinate axis along the measuring path is placed in such a way over a live image of the measuring path that X coordinates in the live image coincide with X coordinates the measuring curves, wherein the X-coordinates in the live image and the corresponding X-coordinates of the measuring curves can be taken from the table coordinates with respect to a travel path of a table, wherein
the live image of sample surface is recorded by a camera, wherein a live image scale is calibrated,
only the part of the measuring path and the measuring curves is displayed which corresponds to a live image width of the live image of a recording camera shown on a screen,
all surface measurements taken along the X-axis are made parallel to the bottom of the live image,
a sample is moved under the camera with the automatic table system in both directions and the table coordinates are determined in this process,
the measuring curves take up all or part of the live image width and are automatically adjusted to the live image when a section of the sample displayed in the live image changes,
a section of the measurements displayed in the graph with displayable curves in shape of measuring curves is adjusted and updated as the table moves in an X-direction to a new sample section so that a portion of the measuring curves is always displayed which corresponds to a live image position,
the live image of the camera is stored together with information containing at least information concerning the table coordinates at a recording location, a distance of the camera from a probe tip, a calibrated live image width and height, and a number of pixels in width and height.

2. The method according to claim 1, characterized in that a combination of the live image of the sample surface with the graph of the measuring curves is stored as a new live image.

3. The method according to claim 1, characterized in that specific measuring curves of an entirety of measuring curves are displayed on one or more Y-axes of the graph of the measuring curves.

4. The method according to claim 1, characterized in that a position of the graph with displayable curves in shape of measuring curves is shifted within a height of the live image, so that it covers a measuring area partially or completely, or not at all.

5. The method according to claim 1, characterized in that a background of the graph with displayable curves in shape of measuring curves is transparent, so that only axes with a caption and the measuring curves themselves are visible in the live image.

6. The method according to claim 1, characterized in that brightness of the live image is controlled.

7. The method according to claim 1, characterized in that a magnification of the live image area is between 500 and 3500 times.

8. The method according to claim 1, characterized in that the coordinates of the table positions are stored during the measurement together with measurement data in a common data file.

9. The method according to claim 1, characterized in that a profile of a surface is displayed on one axis of the graph, a coefficient of friction on a second axis and a normal force of the sample on a third axis.

10. The method according to claim 1, characterized in that after the scratch test or the wear test on an axis, first a profile of a surface is displayed before the test, measured with a small load at which no plastic deformation occurs during scanning, secondly a depth under load and thirdly a profile of the surface after the test, measured with the same small load as before the test.

11. The method according to claim 1, characterized in that prior to fading in graphs, a sharpness of the live image is automatically controlled by varying a height position of the camera.

12. The method according to claim 1, characterized in that a graph occupies not an entire live image width but only a part thereof.

* * * * *